Patented Apr. 16, 1946

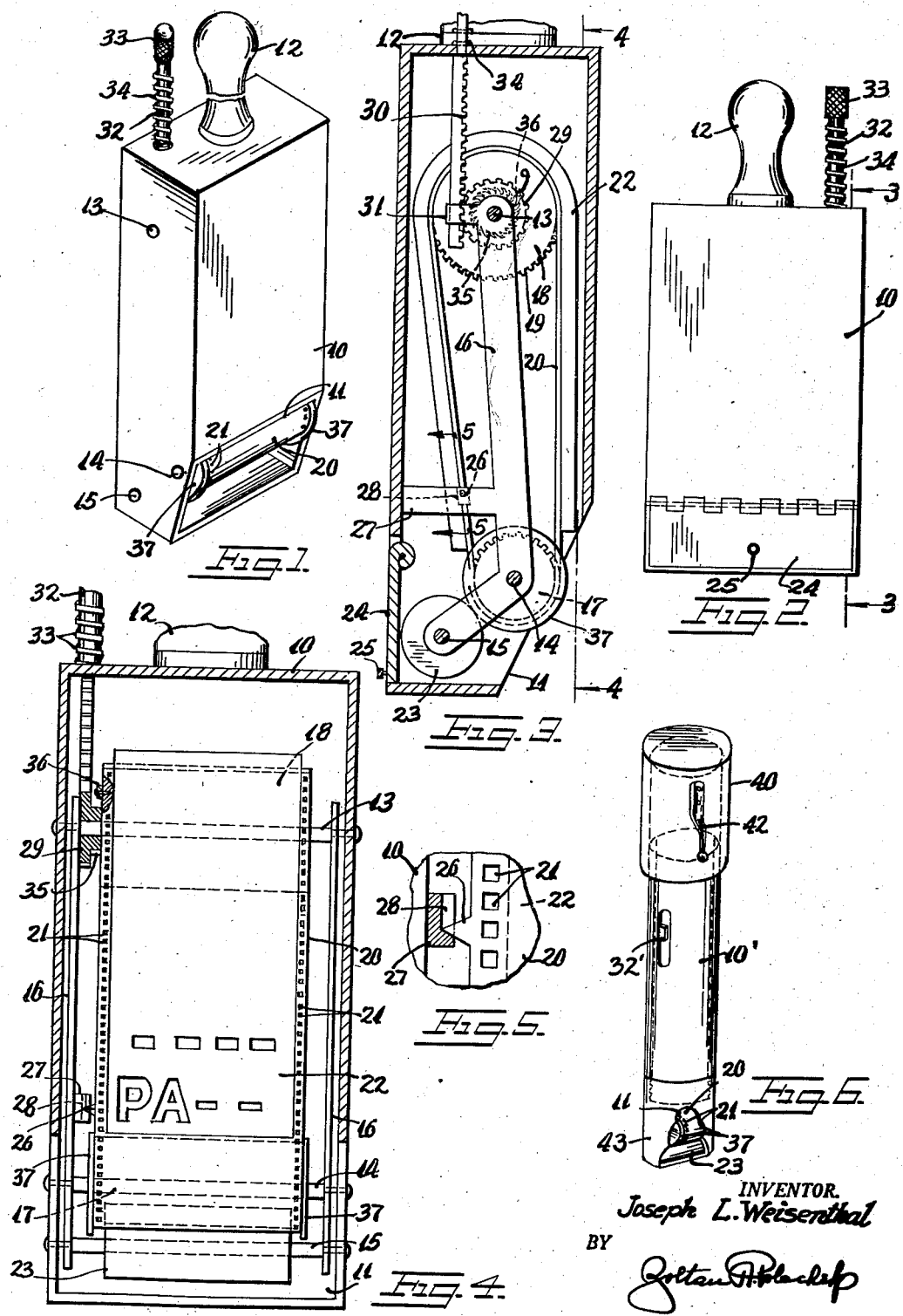

2,398,509

UNITED STATES PATENT OFFICE 2,398,509

SELF-INKING RUBBER STAMP

Joseph L. Weisenthal, Bronx, N. Y.

Application June 23, 1944, Serial No. 541,707

5 Claims. (Cl. 101—329)

This invention relates to new and useful improvements in a self-inking rubber stamp.

More specifically, the invention proposes the construction of a self-inking stamp which provides an improvement over the present day rubber stamps by obviating the necessity of pressing the rubber stamp onto an ink soaked stamp pad before each use of the rubber stamp. The invention proposes providing the inking pad as an integral unit with the construction of the rubber stamp to permit the rubber stamp to be inked with the same motion, consisting in pushing the rubber stamp, which is used to accomplish the impression of the rubber stamp upon the surface to be imprinted.

A further object of the invention proposes the provision of a rubber stamp characterized by a housing enclosing a movable rubber stamping die in which the rolling motion of the component parts will cause the rubber stamp die to be inked and at the same time accomplish the impression of the material provided on the rubber die.

Still another object of the invention proposes providing a pressure roller and idler roller with an endless belt engaged over these rollers for supporting the rubber die to be moved into position beneath the pressure roller as the rollers are turned.

Still another object of the invention proposes an arrangement of a novel brake mechanism in connection with the endless belt for stopping the endless belt in a finished position of the rubber die strip with a means for moving the belt to project the rubber die strip into a starting position.

It is also possible to construct the self-inking rubber stamp with a single wheel or with two rollers in intimate contact with each other, with meshing gear teeth providing the driving connection between the rollers to advance the rubber die strip. It is also proposed that the self-inking rubber die stamp be shaped in the form of a statuette, paper weight or other similar article which will enhance its appearance when positioned upon a desk top. Still another object of the invention proposes constructing the self-inking rubber stamp in the form of a fountain pen and to provide it with a pocket clip by which it can be conveniently carried in one's pocket.

Another object of the invention proposes providing the self-inking rubber stamp with a plurality of adjacent rubber die strips to be inked from a common inking roller and each of which is provided with a mechanism for moving it into a starting stamping position, the housing of which is provided with position-indicating guide lines.

Another object of this invention proposes a plurality of rubber die strips attached in vertical sequence to the endless belt with suitable spacing and braking means secured thereon. Code identification means for correlating the sequence of rubber dies are obtained by the placing of identical signs on the housing and before the respective die strips.

It is a further object of this invention to construct a self-inking rubber stamp which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of a self-inking rubber stamp constructed in accordance with this invention.

Fig. 2 is a rear elevational view of Fig. 1.

Fig. 3 is an enlarged vertical sectional view taken on the line 3—3 of Fig. 2.

Fig. 4 is a vertical sectional view taken on the line 4—4 of Fig. 3.

Fig. 5 is a partial enlarged vertical sectional view taken on the line 5—5 of Fig. 3.

Fig. 6 is a perspective view of a self-inking rubber stamp constructed in accordance with a modification of this invention.

The self-inking rubber stamp, according to this invention, includes a housing 10 having an opening 11 through which a movable rubber die may project. The housing 10 is preferably constructed of sheet metal, plastic, or other similar material and is provided at its top with an upwardly extended handle 12. The opening 11 through which the rubber die is adapted to project is provided by cutting away one of the bottom corners of the housing 10. The remaining portion of the bottom wall of the housing 10 provides a convenient rest by which the device may be rested in a vertical position upon the desk or other flat surface.

Extended laterally across the interior of the housing 10 there are provided shafts 13, 14, and 15. These shafts are rotatively extended between the side walls of the housing 10 and carry spaced support braces 16. A pressure roller 17 is rotatively mounted upon the shaft 14 between the braces 16 and has a portion of its periphery projected through the opening 11. An idler roller 18 is mounted upon the shaft 13 also between the braces 16.

At laterally spaced positions the rollers 17 and 18 are provided with projecting sprocket teeth 19. An endless belt 20 engages over the rollers 17 and 18 for supporting a rubber die. The endless belt 20 is provided at laterally spaced positions with openings 21 adapted to be engaged by the sprocket teeth 19 for evenly advancing the endless belt 20 as the rollers 17 and 18 turn.

A thick rubber die strip 22 is mounted upon the face of the endless belt 20. This thick rubber die strip may be vulcanized, glued or in any other similar manner attached to the endless belt 20. The exposed rubber die stamp 22 is embossed, cut, molded, or in any other manner provided with the message to be imprinted. While it is preferred that this die strip be constructed of rubber it may be constructed of any other similar materials capable of retaining ink and making an impression without smudging.

An inking roller 23 is provided for inking the surface of the rubber die strip 22. This ink roller 23 is rotatively positioned upon the shaft 15 between the braces 16. The back wall of the housing 10 is provided with a pivotally supported door 24 through which inking roller 23 may be reached to be re-inked or changed, when the door is pivoted to an open position. A small knob 25 is mounted upon the free edge of the door 24 providing a grip.

A brake is provided for stopping the belt 20 in a position in which the rubber die strip will have just finished a printing operation. This brake is characterized by a small triangular projection 26 extended laterally from one side of the endless belt 20. The brace 16 at the side of the endless belt 20 provided with the triangular projection 26 is provided with a rearwardly extended extension 27. This extension 27 is provided with a cutout 28 in which the triangular projection 26 is adapted to engage to prevent further movement of the endless belt 20 except under force disengaging the triangular projection 26 from the cutout 28.

A novel means is provided for advancing the belt to advance the rubber die strip 22 from a position in which it has just finished a stamping operation into a position to start another stamping operation. This means is characterized by a gear 29 rotatively mounted upon shaft 13 between the adjacent faces of the idler roller 18 and its adjacent brace 16. This gear 29 meshes with a rack 30. The bottom end of the rack 30 is retained in an engaged position with the gear 29 by means of an extension 31 from the brace 16 which engages about the bottom end of the rack 30. The top end of the rack 30 is provided with a stem 32 which extends from the top of the housing 10 and is provided at its outer end with a knob 33. Pressure is adapted to be applied to the knob 33 to urge the stem inwards pressing the rack 30 downwards to rotate the gear 29. An expansion spring 34 is coaxially wound upon the stem 32 and operates between the top of the housing 10 and the knob 33 urging the stem 32 into its completely extended position. The stem 32 has a square or irregularly shaped cross section and extends through a similarly shaped opening in the top of the housing to prevent rotating thereof and assist in retaining the rack 30 in a position in which it will mesh with the gear 29.

One side of the gear 29 is provided with an integral ratchet wheel 35 engaged by a spring pressed pawl 36 mounted upon the end of the idler roller 18. The arrangement of the ratchet wheel 35 and the pawl 36 is such that it insures an advancement of the idler roller 18 when the rack 30 moves downwards and also permits the gear 29 to turn independently of the idler roller 18 when the rack 30 moves upwards under the influence of the spring 34. The arrangement of the ratchet wheel 35 and the pawl 36 permits the roller 18 to rotate independently of the gear 29 when the rollers 17 and 18 are advancing the endless belt 20.

Wheels 37 are mounted on the shaft 14 on either side of the pressure roller 17 between the braces 16 and extending from the opening 11. The wheels 37 are of a diameter to extend from the opening 11 a lesser distance than the rubber die stamp for supporting the housing when the end of the rubber die strip passes the opening 11 preventing the endless belt 20 from contacting the surface being imprinted.

The manner of using the self-inking rubber die stamp is as follows:

Normally the parts of the self-inking rubber die stamp will appear as shown in Figs. 3 and 4 and the stamps may be rested in a vertical position upon a desk or other flat surface to appear as shown in Fig. 1. To use the rubber die stamp the handle 12 is gripped in one hand and the housing 10 is extended into a rearwardly inclined position in which the opening 11 will be parallel to the surface of the paper or other article upon which the impression is to be made. In this position the stem 32 is urged inwards against the the action of the spring 34 rotating the gear 29 through the medium of the rack 30. The pawl and ratchet wheel arranged between the gear 29 and the idler roller 18 will be locked causing the idler roller 18 to be rotated. This will advance the endless belt 20 moving the triangular projection 26, forming the brake, out of an engaged position with the cutout 28. One complete inward movement of the stem 32 will advance the rubber die strip 22 from a position in which it is just finished a stamping operation, as shown in Fig. 3, into a starting position in which the forward end of the rubber die strip 22 will be in a position beneath the pressure roller 17. Since the rubber die strip 22 is of a thickness to project beyond the wheels 37 the end of the rubber die strip 22 will now engage the surface to be imprinted. The stem 32 may now be released and the spring 34 will urge it upwards into a position shown in Figs. 1 and 2. On this return movement of the stem 32 the rack 30 will be moved rotating the gear 29 and the ratchet wheel 35 which will idle past the spring pressed pawl 36.

The device is now ready to imprint. This is accomplished by applying pressure to the handle thereof as the device is pushed forwards. This will cause the rollers 17 and 18 to be rotated advancing the rubber die strip 22 past the inking roller 23 which will ink the surface of the die strip 22 to cause it to make an impression. This operation may be continued until the endless belt 20 makes one complete revolution reengaging the triangular projection 26 with the cutout 28 to restrain a free movement of the endless belt 20. In this position the rubber die strip will have just finished a stamping operation. For the next stamping operation the above procedure is repeated.

It is to be remembered that the door 24 may be opened for the purpose of replenishing the supply of ink on the inking roller 23 or for replacing this inking roller when desired.